Jan. 18, 1966 C. M. SMITH 3,229,830
PLATFORM LIFT TRUCK
Filed June 4, 1964 3 Sheets-Sheet 2
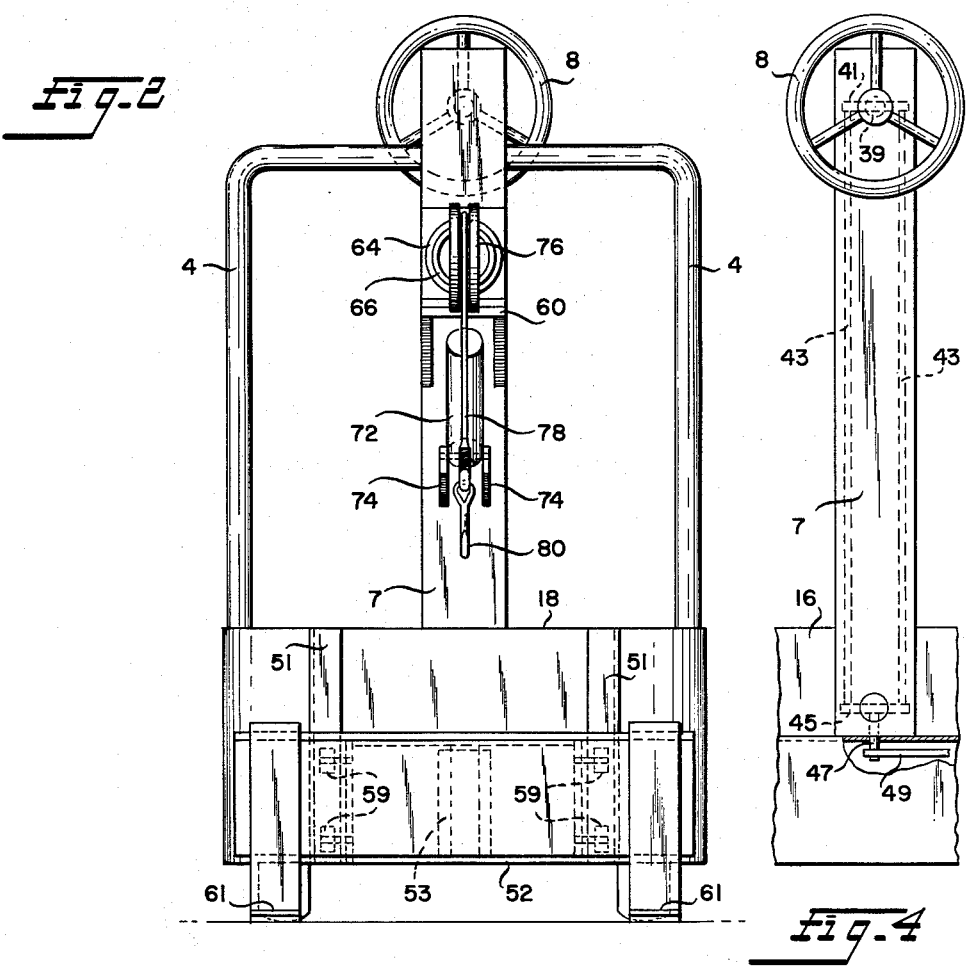
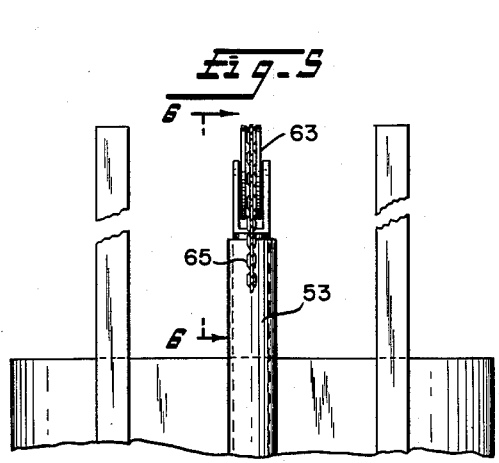
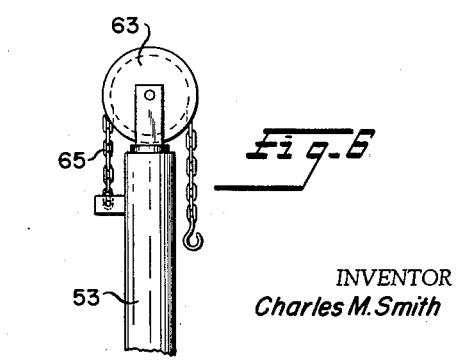
INVENTOR
Charles M. Smith
BY
ATTORNEY Jan. 18, 1966     C. M. SMITH     3,229,830
PLATFORM LIFT TRUCK
Filed June 4, 1964     3 Sheets-Sheet 3
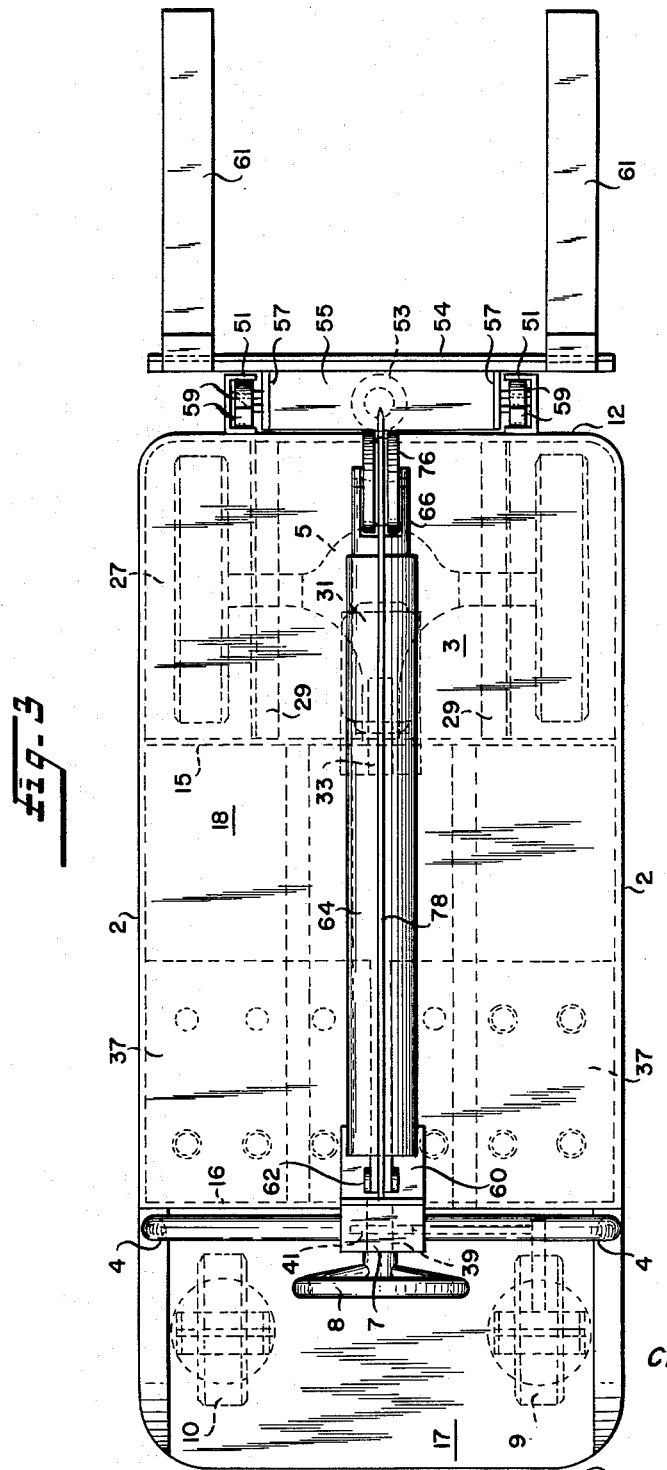
INVENTOR
Charles M. Smith
Sabin C. Bronson ATTORNEY ced to the drive shaft 19. Such a gas engine is about 25" long, 15" wide and 20" high, and can easily be installed under the top 18.

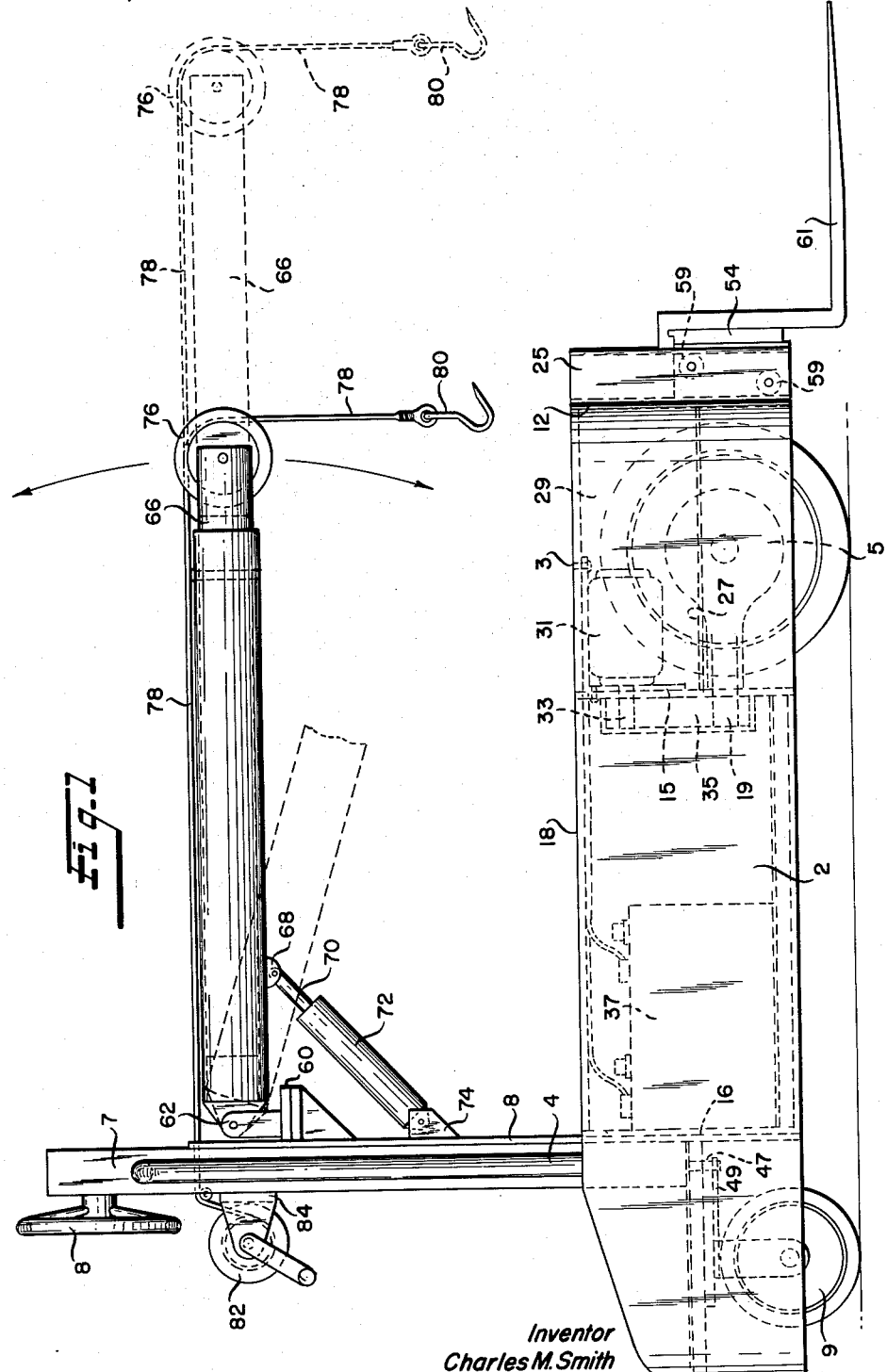

United States Patent Office
3,229,830
Patented Jan. 18, 1966

3,229,830
PLATFORM LIFT TRUCK
Charles M. Smith, Park Forest, Ill.
(20340 Fairfield Ave., Olympia Fields, Ill. 60461)
Filed June 4, 1964, Ser. No. 372,504
7 Claims. (Cl. 214—77)

This invention relates to material handling equipment generally and in particular to a power driven platform truck for the handling and movement of commodities and to which may be added other material handling devices for operation by the motor of the truck, or independently powered or by manually operated hydraulic or manual means. The versatility of the truck, along with its low cost of construction, are prime virtues and principal objects of the invention.

Due to the extremely hard usage given such equipment, the invention is of rugged construction so as to be able to absorb considerable abuse in its every day use.

The truck of my invention is extremely versatile, and flexible, primarily useful as a platform truck to haul loads and pull trailers, and secondarily as a platform truck with load-lift capabilities by attachable fork lift and/or crane accessories, and has high strength for safe utilization of said accessories.

These and other advantages and objects of the invention will appear in the following description of the invention.

Referring now to the accompanying drawing forming part of this application and wherein like reference characters indicate like parts:

FIGURE 1 is a side elevation of my improved platform lift truck, illustrating the lifting forks and the crane as attached thereto for maximum versatility, and showing in dotted lines the battery and motor compartment.

FIGURE 2 is a front elevation of FIG. 1.
FIGURE 3 is a top plan view of FIG. 1.
FIGURE 4 is a front view of the steering mechanism.
FIGURE 5 is a front view of the device equipped for higher lift of the forks.
FIGURE 6 is a view on line 6—6 of FIG. 5 of the hydraulic cylinder for elevating the fork tines when necessary.

In the drawings, the basic truck unit will be about 64" in total length, about 30" in total width and about 18" in platform height. The platform bed on the front portion of the truck will measure about 30" by 48". A width of 30" for this type of truck is about the maximum that can be used because such trucks must pass through warehouse doors, some of which are as narrow as 30", and in this event the truck width may be 29", but should not be less than this for stability.

As will be seen in FIGURE 3, the truck is four-wheeled for truck and load stability, and is also constructed with low center of gravity for stability, the front wheels being power driven and the rear wheels steerable. The rear end of the truck is provided with a relatively small platform upon which the operator stands when driving the truck about.

The truck frame comprises two plates 2 which are formed into channel shape with 1½" flanges and a web width of about 14". The front frame piece 12 is of ½" plate extending between the ends of the side frame members or plates 2, and the ends of the front frame 12 are curved on a relatively short radius to meet and be welded to the ends of the side frame members. This end plate 12 must be heavy and strong so as to be able to support the fork lift mast uprights 25, hereinafter described.

Inwardly from the end 12 of the truck, about one-third of its length, is a frame plate and stiffener 15, which is a rectangular plate extending between the side frames 2, the plate and stiffener 15 being the same width as the side frames. Thus the plates 12 and 15 and the included portion of the side frames form a rectangular compartment 27 for the driving wheels and differential assembly of the truck.

This compartment 27 has an open bottom and a closed deck or top 3. Inwardly facing channels 29 are secured to the under side of the top of the compartment 27 so that the webs of said channels are at right angles to the top 3. The bottom flanges of these channels 29 rest upon and are secured to the axle housings of the wheel and axle assembly and differential 5. The drive shaft 19 of this assembly projects thru the plate 15 a short distance for connecting thereto any form of power for driving the unit. In the present instance we prefer to mount a reversible D.C. electric motor 31, end flange mounted, of about two or two and one-half horsepower capacity directly over the differential and with the motor flange bolted to the plate 15. Such motors are about 6½" in diameter and about 13" long so that there is plenty of room to accommodate same. The motor drive shaft 33 protrudes through the plate 15 above the stub shaft 19. A gear reduction unit 35 connects the two shafts and is case enclosed for running in oil.

The differential housing surrounding the driving axles is rigidly mounted to the frame channels 29 by being bolted thereto. The differential drive shaft housing is provided with a flange abutting the frame member 15, and is held thereto by four bolts. The entire differential and wheel assembly may therefore be easily and quickly removed for servicing by removing but four bolts which hold the differential axle housing to the main frame and four bolts which hold the flange of the differential drive shaft housing to the frame member 15. The whole assembly can then be removed through the bottom of the truck frame.

The motor 31 is of 36 volt capacity and the battery compartment is between the plate or wall 15 and the like plate or wall 16 parallel therewith and mounted between the two side walls 2. Batteries 37 of any size may be utilized so long as they provide 36 volts. For example, six 6-volt batteries may be connected together and installed in the battery compartment for providing the power. Or a single heavy duty industrial type 36-volt battery may be installed, it having about the same overall dimensions as the six 6-volt batteries above mentioned. Another type of heavy duty industrial battery which is about 7" by 26" by about 24" to 30" high could be installed on the floor of the compartment just adjacent the steering column 7. As before stated, any battery arrangement that will deliver the required voltage may be used.

For foot operation, an accelerator pedal is installed, as is common, for control of the speed of the truck, this pedal being installed on the operator's platform at one side of the steering column 7. On the other side of the steering column a brake pedal is installed also for foot operation by the operator in standing position. The details of the accelerator, connected of course to the battery and motor, and of the brake mechanism, are not shown, being common in this type of equipment.

The top 18 extends over the battery compartment and drive motor and wheel and axle compartment, and forms a surface for carrying packages and the like from place to place as a platform truck.

It is obvious that the structure provides for quick removal, replacement, or recharging of batteries when necessary.

In cases of more continuous operation of the truck, a gas engine of up to about 10 h.p. could be used and installed on the bed of the compartment—just ahead of the steering column, with the shaft in line with and connected to the stub shaft 19 through a clutch or automatic transmission of a kind suitable for the purpose.

Any type of power may be used as preferred by the purchaser of the truck.

The wall 16 forms the forward wall of the operator's compartment 17, which is the stand in type. In the center and against the wall 16 is mounted the vertical steering column 7, having a steering wheel 8 mounted at the upper end of the column at a convenient height for the operator. The steering wheel shaft 39 extends within the column and is journalled therein on an axis at right angles to the column. A pin 41 extends through the shaft 39 at the ends of which are pivoted vertical shafts or links 43—43, which are pivotally connected to the ends of a T-shaped link 45 pivotally mounted at the lower end of the column 7. The stem 47 of the T-shaped link 45 is connected to an arm 49 extending from the castor wheel 9 so that movement of said arm 49 by the steering wheel through said linkage will steer said wheel 9. The other castor wheel 10 will follow as the truck moves.

The steering column 7, reinforced by a plate 8, is shown as mounted centrally of the operator's compartment, but obviously it may be advantageously mounted so as to project upwardly over the steerable castor wheel 9 and thus eliminate one link in the steering linkage, as well as providing more room for loading long narrow objects on the platform bed which would overhang the rear of the truck.

The foregoing sets forth the basic platform truck unit which is of very rugged construction and useful for all platform truck needs.

The truck frame is constructed so that it will accept narrow extensions for the platform bed of the truck in the event the user wants a platform bed larger than about 30" by 48". If for example 6" wide extensions were used on each side of the truck, the platform would then be 42" by 48". If a 6" extension is added to the front end of the truck, the size of the platform would become 30" by 54", or if the 6" extensions were added to the sides and end of the truck, the platform would be 42" by 54".

For those situations where a lift truck in addition to a platform truck is desirable, means are provided for the quick attachment of lift forks to the forward end of the platform truck just described. In most instances means to lift pallets or packages off the ground surface or floor, about six inches or so are all that is required to move the material about or from place to place.

To provide such accessory for the platform truck, a pair of spaced channels 51, facing each other, are secured to the end plate 12 of the truck frame, one adjacent each corner of the truck. An extension 52 of the base or bed of the truck extends outwardly of the bottom of end plate 12, and on the center of this extension is mounted an upright hydraulic lift cylinder 53. A load carriage is provided comprising a vertically disposed plate 54, a horizontal plate 55 extending from the upper edge of the plate 54, two side plates 57—57, depending from the ends of plate 55 and secured thereto along their upper edges, and also secured along their outer vertical edges to plate 54. Extending outwardly from the plates 55 are a pair of rollers 59—59 which project within the channels 51—51, and roll therein as the load carriage moves up or down in response to action of cylinder 53. Rollers 59—59 are positioned so that the upper one will bear against the outer flange of channels 51 and the lower rollers will bear against the inner flange of channels 51. The forks of the carriage are shown at 61 and are of L-shape, the upright portion hooking over the upper edge of the plate 54 so as to move therewith. Thus when the cylinder 53 is pumped, the piston will elevate the load carriage assembly, lifting whatever is on the forks 61—61.

If a higher lift is desired, it is just a matter of adding extensions to the channels 51 and providing a cylinder with a sheave 63 on the upper end of the piston, with a cable or chain 65 over the sheave and anchored at one end to the cylinder and with the other end hooked into the carriage. With this arrangement, when the piston rises, the hook will elevate at a faster rate than the rise of the piston. See FIGS. 5 and 6.

It should be emphasized that the fork lift attachment shown is of the non-tilting type, this being satisfactory for most low lift loads, or medium lift loads. It is obvious however that should one wish a tilting lift attachment for higher lift loads, such may be easily substituted for the one shown.

Also it will be noted that the fork lift is not of the straddle load type.

For still further convenience of this platform truck, provision is made for the addition thereto of a telescopically adjustable crane, which may be quickly and easily applied or removed therefrom.

Attached to the forward side of the steering column 7 and its reinforcing plate 8, is a bracket 60 which has a pair of spaced arms 62 extending upwardly therefrom, between which is pivotally mounted the inner end of the telescopic boom of the crane accessory. The boom is made in two telescopically united parts 64 and 66, the outer part 66 slidable within the inner part 64 and the two may be fixed in any adjusted position by applying a locking pin through any registering pair of spaced holes through the two parts of the boom. The inner part 64 of the boom is provided on its under surface near the steering column with a bracket 68 which pivotally supports the end of the piston 70 of a hydraulic manually operable cylinder 72, the other end of which is pivotally attached to a bracket 74 attached to the steering column 7 and reinforcing plate 8 at a location so that the cylinder is diagonally disposed at an angle of about 45° between the boom and column. The operator can manually actuate a pump to cause the cylinder to position the boom at any angle desired within the limits of the cylinder.

The outer end of the outer section 66 of the boom is provided with a pulley wheel 76 pivotally mounted therein for support of a cable 78 having a hook 80 on the end thereof. The cable leads back over the boom, through the steering column 7 and to a hand winch 82 mounted in a bracket 84 secured to the steering column. Thus by winding the cable up on the winch 82, any load on the hook 80 may be elevated, and likewise may be lowered by reversing the direction of the winch, or raising or lowering the boom may elevate or lower the load.

The load guard rail 4 is a very rigid U-shaped or channel shaped member, the lower ends of which are attached securely to the side frame members, and which guard rail extends upwardly to about the level of the steering wheel axis, and the upper horizontal portion of the guard rail connects the two side portions thereof. This forms a convenient rail for the operator to grasp when the truck is moving and also helps in preventing loads from being knocked against the operator, etc.

In summary, and to emphasize the versatility of the unit, the truck frame and chassis construction, its differential and driving wheel assembly, steering wheel assemblies, and running gear, are all constructed so as to be:

(a) standard or common or basic to all uses of the proposed truck;

(b) suitable for narrow aisle operation and narrow door pass through;

(c) proportioned to accept any of various battery arrangements for power, or in lieu of electric power, an internal combustion engine and transmission;

(d) suitable to receive a fork lift assembly on the front of the truck;

(e) suitable to receive a crane accessory;

(f) usable as a platform truck only, or with a fork lift assembly only, or with a crane assembly only, or with any combination of such accessories;

(g) usable as as light duty tow tractor.

In operation the operator stands on the operator's platform on the rear of the truck, steering the same while actuating the foot accelerator and/or the brake pedal. In the great majority of cases where the crane is needed, the horizontal position of the boom will be sufficient. If more room is needed, a foot pedal not shown is successively depressed so that the hydraulic cylinder piston 70 will be forced therefrom to elevate the boom.

The same type of operation for actuating and elevating the lift forks 55 is resorted to when this accessory is utilized.

I claim:

1. A platform truck of the character described comprising in combination a rectangular frame structure, including side and end frame members, a transverse frame plate and stiffener spaced from one end frame member and extending between the side frame members, forming a compartment at the forward end of the truck, a platform bed extending over and secured to the upper edges of said frame structure, a driving wheel and differential axle assembly including a drive shaft mounted in said compartment, power means including a drive shaft for driving said assembly mounted in said compartment, the power means shaft and the differential drive shaft projecting through said frame plate and stiffener, driving means operationally connecting said shafts together, a pair of steerable wheels at the rear of the truck, and means for steering said wheels.

2. The structure of claim 1, said steering means connected to one of said steerable wheels, for steering said truck.

3. The combination of claim 1, said power means being mounted over said wheel and axle assembly and connected thereto through a gear reduction unit.

4. The combination of claim 1, said frame having means for the attachment thereto of a fork lift unit.

5. The combination of claim 1, said truck having means for the attachment thereto of a crane unit.

6. The combination of claim 1, and a stand-up type operator's compartment at the rear of the truck, the entire area forward thereof comprising a flat bed extending over the wheel and axle and power unit assembly for the loading of articles thereon.

7. The combination with a platform truck of the character described having a rigid rectangular frame structure, transverse walls dividing said structure into a forward compartment, a rear driver's compartment and an intermediate compartment, a driving wheel and differential axle assembly including a drive shaft mounted in said forward compartment, power means including a drive shaft for driving said assembly also mounted in said forward compartment, the differential drive shaft and the power means shaft projecting into the intermediate compartment, a gear train in the intermediate compartment connecting said shafts together, and a flat platform over the forward compartment and intermediate compartment for carrying of articles thereon.

References Cited by the Examiner

UNITED STATES PATENTS

| | | | |
|---|---|---|---|
| 2,386,759 | 10/1945 | Ulm | 214—620 |
| 2,885,016 | 5/1959 | Ayers | 187—9 XR |
| 2,892,555 | 6/1959 | Hooker | 214—75 |
| 2,899,088 | 8/1959 | Corbin | 214—75 |
| 2,947,425 | 8/1960 | Nichols | 214—75 |

GERALD M. FORLENZA, *Primary Examiner.*

R. G. SHERIDAN, *Assistant Examiner.*